(No Model.)
T. A. EDISON.
ELECTRICAL GENERATOR AND MOTOR.
No. 276,233. Patented Apr. 24, 1883.
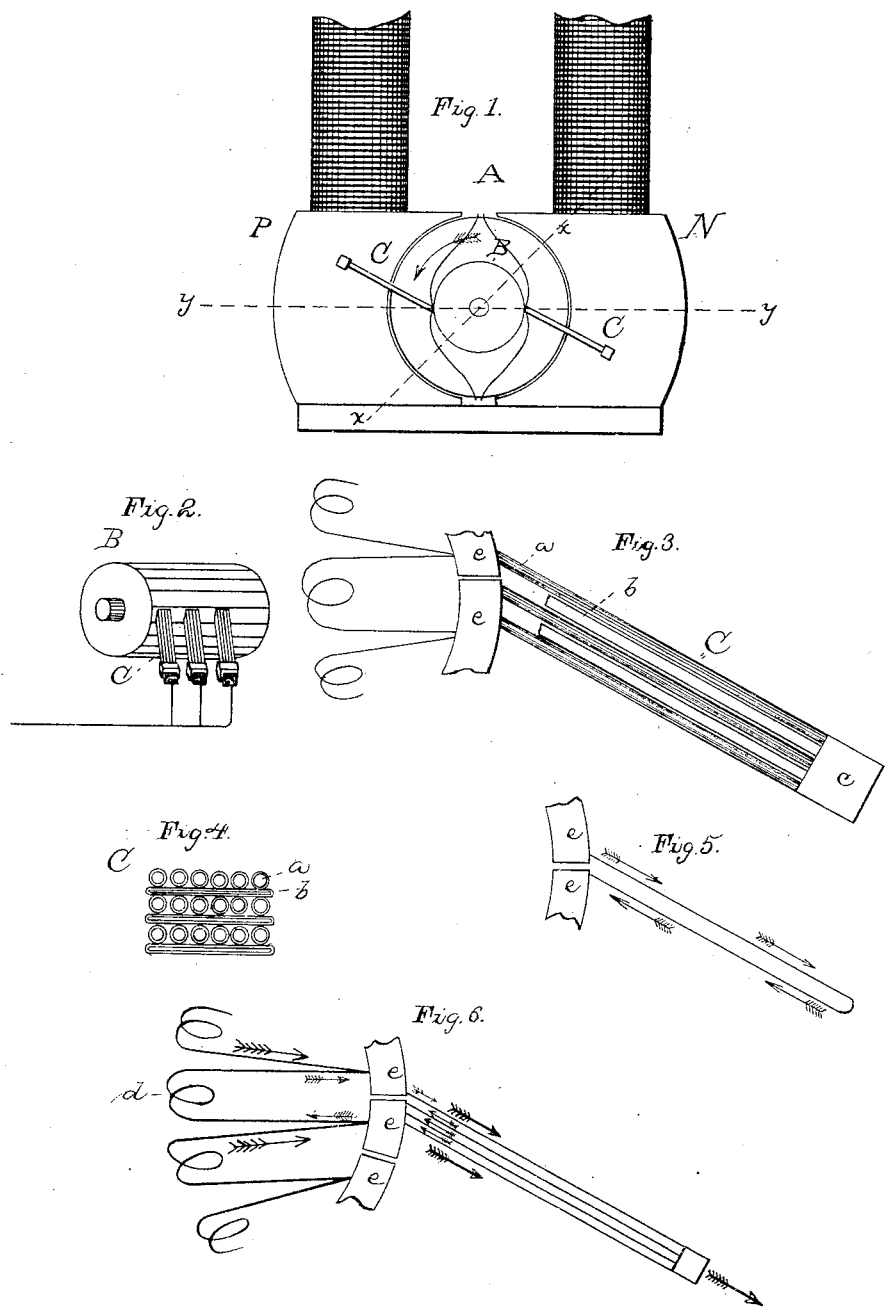
ATTEST:
E. E. Rowland
V. H. W. Seely
INVENTOR:
Thomas A. Edison
By Rich'd N. Dyer
Atty.

UNITED STATES PATENT OFFICE.

THOMAS A. EDISON, OF MENLO PARK, NEW JERSEY.

ELECTRICAL GENERATOR AND MOTOR.

SPECIFICATION forming part of Letters Patent No. 276,233, dated April 24, 188.

Application filed November 23, 1882. (No model.)

*To all whom it may concern:*

Be it known that I, THOMAS A. EDISON, of Menlo Park, in the county of Middlesex and State of New Jersey, have invented a new and useful Improvement in Electrical Generators and Motors, (Case No. 517,) of which the following is a specification.

In the working of continuous-current dynamo-electric machines or electro-dynamic motors the increase of the load of such machines causes the neutral line, or the line where there is the least spark, to advance in the direction of rotation, (away from the line of maximum electro-motive force or work,) which I have found is always located on the armature centrally between the polar extensions of the field-magnet. It has been found necessary heretofore to shift the commutator-brushes or current-collectors forward to the neutral line in order to prevent destructive sparks, which are due to the cutting of lines of force produced by the polarity of the armature-core, caused by the current flowing through the armature-coils; but the removal of the brushes away from the line of maximum electro-motive force of the generator reduces the electro-motive force of the machine. With electro-dynamic motors the difficulties are greatly increased, since the load may vary frequently, and, if the brushes are adjusted for the average load, the shifting of the neutral line away from the brushes will be productive of undue sparking, destructive both of the commutator and the brushes.

The object, therefore, of this invention is to produce means whereby the current-collectors or commutator-brushes may be retained at the points of maximum electro-motive force or work of the generator or motor without undue or destructive sparking, the capacity of the machines being thereby largely increased.

It has been the universal practice heretofore to use for the commutator-brushes of machines of this character copper or other metal having good electrical conductivity and making good electrical contact. I have found that the copper brushes, by reason of their great conductivity and good contact, form circuits of very low resistance between the bars of the commutator as they pass over them, and hence short-circuit in succession the coils connecting the pairs of commutator-bars, such coils then forming a local dynamo and generating a powerful local current. The breaking of that short circuit, which takes place when the brushes leave a commutator-bar, causes the destructive spark. The generation of the powerful local currents also causes the heating of the machine and the loss of energy due to such heating.

I reverse the practice heretofore followed, and provide current-collectors of inferior electrical conductivity and contact, compared with copper, so that the bridge formed by each collector across the commutator-bars will have a large resistance compared with the local coils, the circuit of which is completed within the machine by the bridging of the commutator-bars; hence the local current will be very weak and the spark comparatively nothing. With current-collectors of this character I am enabled to keep the collectors at the points of maximum electro-motive force or work, notwithstanding these may not be the neutral points, and by providing a number of such collectors I can get the requisite total conductivity and contact to carry the main current without sparking. The current-collectors, whether in the form of wire brushes, plate-springs, or of other form, are made of some metal or alloy having inferior conductivity, and making inferior contact compared with copper, and preferably having a high melting-point. Nickel, iron, steel, cobalt, platinum, or palladium might be used, or alloys, such as phosphor-bronze or brass; but I prefer to use German silver for the purpose, for the reason that it offers very great resistance and does not lose its stiffness by heat, as most alloys do. The current-collectors, when made as brushes, are made up of layers of wires, which are preferably separated by metal plates, the whole being soldered together into a solid mass at one end. To increase the resistance of the bridge formed by the brush, the layers of wire are preferably insulated from each other. This may be done by japanning the separating metal plates. The wires themselves may also be japanned and the separating-plates omitted or not, as desired. The separating japanned metal plates may be replaced by strips of mica or other suitable insulating material; but the japanned metal is preferred.

The brush has its end bearing on the commutator-cylinder, the ends of all or nearly all the wires being in contact therewith. The current, in passing from one bar to another through the brush, is forced to travel up part of the wires to the solid end of the brush and then down other wires to the other bar, the resistance of the length of the wires being interposed in the local circuit. The high resistance is due not only to the resistance offered by the metal of the current-collectors, but largely to the inferior electrical contact of the collectors on the commutator-cylinder, which occurs when metals or alloys having a conductivity inferior to copper are used for the collectors. The contact-resistance may be further increased by constructing the commutator-bars or surfacing them with such a metal or alloy as has been described, making an inferior electrical contact compared with copper. In addition to the local sparking, there is the sparking due to the taking off of the main current. This latter sparking is of course increased by the inferior contact made by the current-collectors. The sparking due to the main current can be prevented by increasing the number of collectors or the component parts of the collectors to such an extent that the spark due to the main current will be reduced to the minimum by division.

In the accompanying drawings, Figure 1 illustrates a dynamo-electric machine or electro-dynamic motor with commutator-brushes arranged in accordance with my invention; Fig. 2, a view of the commutator, showing several brushes; Fig. 3, a view on a larger scale of two bars of a commutator and the improved brush; Fig. 4, a cross-section of the brush; Fig. 5, an illustration of the course taken by the local current through the electrically-divided brush, and Fig. 6 an illustration showing the course of the local and main currents.

P N, Fig. 1, are the polar extensions of the field-magnet of the generator or motor, A being the armature; B, the commutator-cylinder, and C C the commutator-brushes. The varying neutral line on the commutator-cylinder is represented by the dotted line $x\,x$ and the line of maximum electro-motive force by the dotted line $y\,y$. The armature-coils are connected with the commutator-bars at intermediate points, as indicated by the lines in Fig. 1, bringing the points of maximum electro-motive force on the commutator opposite the center of the polar extensions of the field-magnet. The lines $x\,x$ and $y\,y$ correspond with the neutral line and the line of maximum electro-motive force on the commutator, and are perpendicular to corresponding lines on the armature.

Heretofore, in order to prevent sparking, it has been found necessary to shift the brushes onto the line $x\,x$; but I am enabled by the peculiar construction of my brushes and the commutator-bars (either or both) to keep them on line $y\,y$ without sparking. Two or more commutator-brushes connected together are used on each side of the commutator-cylinder to carry the current, as shown in Fig. 2. Each brush may be constructed of layers of wires $a$, of German silver or other inferior conducting metal or alloy, the layers being divided by metal plates or strips $b$.

The wires $a$ and plates $b$ are formed into a solid mass by soldering at the outer end, $c$, of the brush. The plates $b$ are japanned, as are also the wires $a$, so as to insure a good electrical division of the brush. The brush rests with the ends of all its wires bearing on the commutator-cylinder, as shown. The course of the local current is indicated by the small arrows in Figs. 5 and 6, while the course of the main current is indicated by the large arrows in Fig. 6.

The local coil $d$, Fig. 6, has its circuit closed at the commutator by the bridge formed by the brush. This bridge, however, is of high resistance compared with the coil $d$. It is made so by the inferior electrical contact of the brush on the commutator by the inferior conductivity of the metal of which the brush is made, and also by the electrical division of the brush at its inner or bearing end.

It will be noticed that the local current, in addition to being forced to overcome the resistance offered by the length of the wires, has to overcome the main current in one side of the bridge formed by the brush.

The bars $e$ of the commutator B may also be made of or surfaced with German silver or other suitable alloy or metal, making inferior electrical contact compared with copper. This increases the resistance of the contact and makes the bridges formed by the brushes of higher resistance.

What I claim is—

1. The combination, with an electrical generator or motor, of current-collectors, each forming a bridge of high resistance between the bars of the commutator, substantially as set forth.

2. The combination, with an electrical generator or motor, of current-collectors making inferior electrical contact at the commutator-cylinder of said generator or motor, substantially as set forth.

3. A current-collector for electrical generators or motors, made of inferior conducting material, substantially as set forth.

4. In an electrical generator or motor, the combination, with the commutator, of current-collectors divided electrically at their bearing ends in the direction of the motion of the commutator, whereby the collectors will form bridges of high resistance between the commutator-bars, substantially as set forth.

5. A current-collector for electrical generators or motors, made of inferior conducting material and divided electrically, substantially as set forth.

6. The combination, with an electrical generator or motor, of a commutator-cylinder having its bars made of or surfaced with a material making inferior electrical contact with the current-collectors, substantially as set forth.

7. In an electrical generator or motor, the combination, with the commutator-cylinder, of the current-collectors, the bars of said commutator-cylinder and said collectors being both constructed of or surfaced with a material making inferior electrical contact, substantially as set forth.

8. In an electrical generator or motor, the combination, with the commutator-cylinder, of a number of current-collectors, each offering a high resistance to the local current, and having a combined contact and conductivity sufficient to carry the main current, substantially as set forth.

9. A current-collector made of German silver, substantially as set forth.

10. A commutator having its bars made of or surfaced with German silver, substantially as set forth.

11. A commutator-brush constructed of wires arranged in layers, the several layers being insulated from each other at the bearing end of the brush, substantially as set forth.

12. A commutator-brush constructed of wires, the separate wires being all insulated from each other at the bearing end of the brush, substantially as set forth.

This specification signed and witnessed this 14th day of November, 1882.

THOS. A. EDISON.

Witnesses:
 WM. H. MEADOWCROFT,
 EDWARD H. PYATT.